United States Patent
Alvarez-Cuenca et al.

(10) Patent No.: US 9,522,833 B2
(45) Date of Patent: Dec. 20, 2016

(54) SIMULTANEOUS TREATMENT OF AMMONIA AND PHOSPHORUS IN A VERTICAL REACTOR

(71) Applicants: Manuel Alvarez-Cuenca, Toronto (CA); Maryam Reza, Toronto (CA)

(72) Inventors: Manuel Alvarez-Cuenca, Toronto (CA); Maryam Reza, Toronto (CA)

(*) Notice: Subject to any disclaimer, the term of this patent is extended or adjusted under 35 U.S.C. 154(b) by 57 days.

(21) Appl. No.: 14/286,123

(22) Filed: May 23, 2014

(65) Prior Publication Data

US 2014/0346109 A1 Nov. 27, 2014

Related U.S. Application Data

(60) Provisional application No. 61/826,676, filed on May 23, 2013.

(51) Int. Cl.
C02F 3/30 (2006.01)

(52) U.S. Cl.
CPC .............. C02F 3/308 (2013.01); C02F 3/301 (2013.01); C02F 3/307 (2013.01)

(58) Field of Classification Search
CPC ............ C02F 3/308; C02F 3/301; C02F 3/307
USPC ....... 210/602, 621, 623, 630, 252, 259, 260, 210/261, 262, 903, 906, 605
See application file for complete search history.

(56) References Cited

U.S. PATENT DOCUMENTS

| | | | |
|---|---|---|---|
| 2001/0045390 A1* | 11/2001 | Kim | C02F 3/308 210/605 |
| 2012/0031836 A1* | 2/2012 | Alvarez-Cuenca | C02F 3/301 210/605 |
| 2012/0067817 A1* | 3/2012 | Giraldo | C02F 3/1268 210/605 |

FOREIGN PATENT DOCUMENTS

CN 101244883 A * 8/2008

* cited by examiner

*Primary Examiner* — Fred Prince
(74) *Attorney, Agent, or Firm* — Gowling WLG (CANADA) LLP

(57) ABSTRACT

There is described a number of biological nutrient removal processes including Anammox Process, Biological Phosphorus Removal (BPR), Partial Nitrification, Full Nitrification, Partial Denitrification, Full Denitrification and Denitrification via BPR taking place in a Simultaneous Treatment of Anammox/PAOs Reactor (STAR) coupled with an Anaerobic Lateral Unit (ALU). In one aspect, there is a wastewater treatment system comprises a bioreactor having three consecutive stages: and an anaerobic lateral unit (ALU) coupled to the bioreactor; the bioreactor and ALU are configured to conduct biological removal of nutrients from the wastewater using a plurality of biological processes simultaneously. The three consecutive stages of the bioreactor comprise two Anoxic stages configured consecutively followed by one Aerobic stage. The stages may be oriented vertically and use gravity for fluid flow.

19 Claims, 7 Drawing Sheets

Schematic Diagram of the Bioreactor (STAR) and ALU

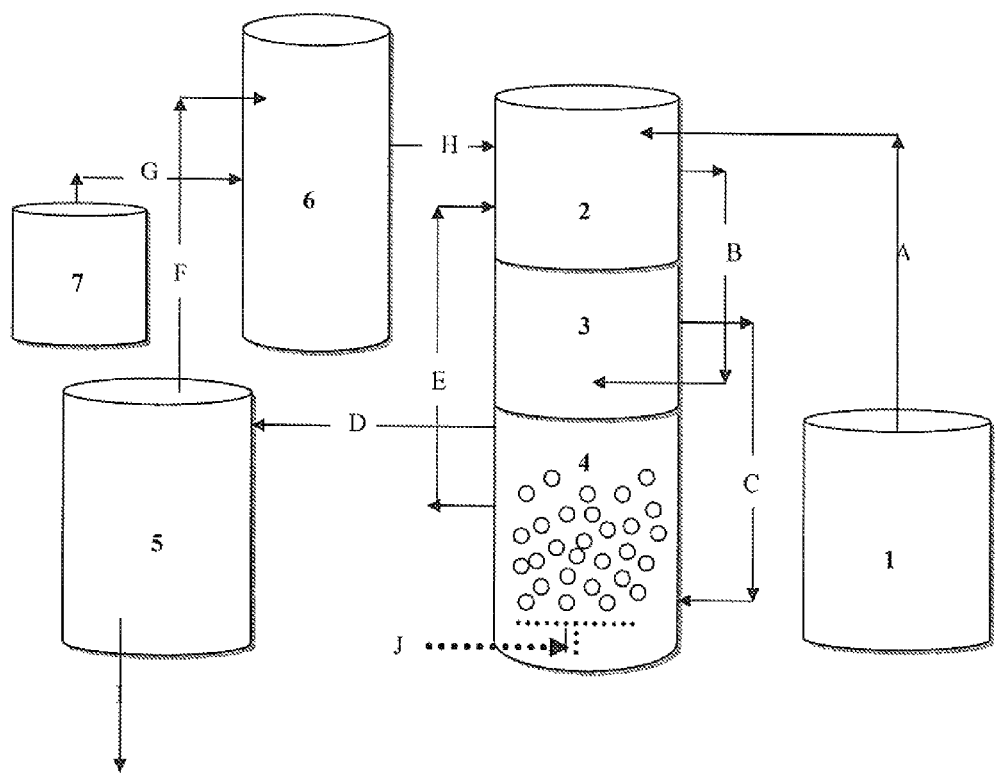
FIG. 1: Schematic Diagram of the Bioreactor (STAR) and ALU

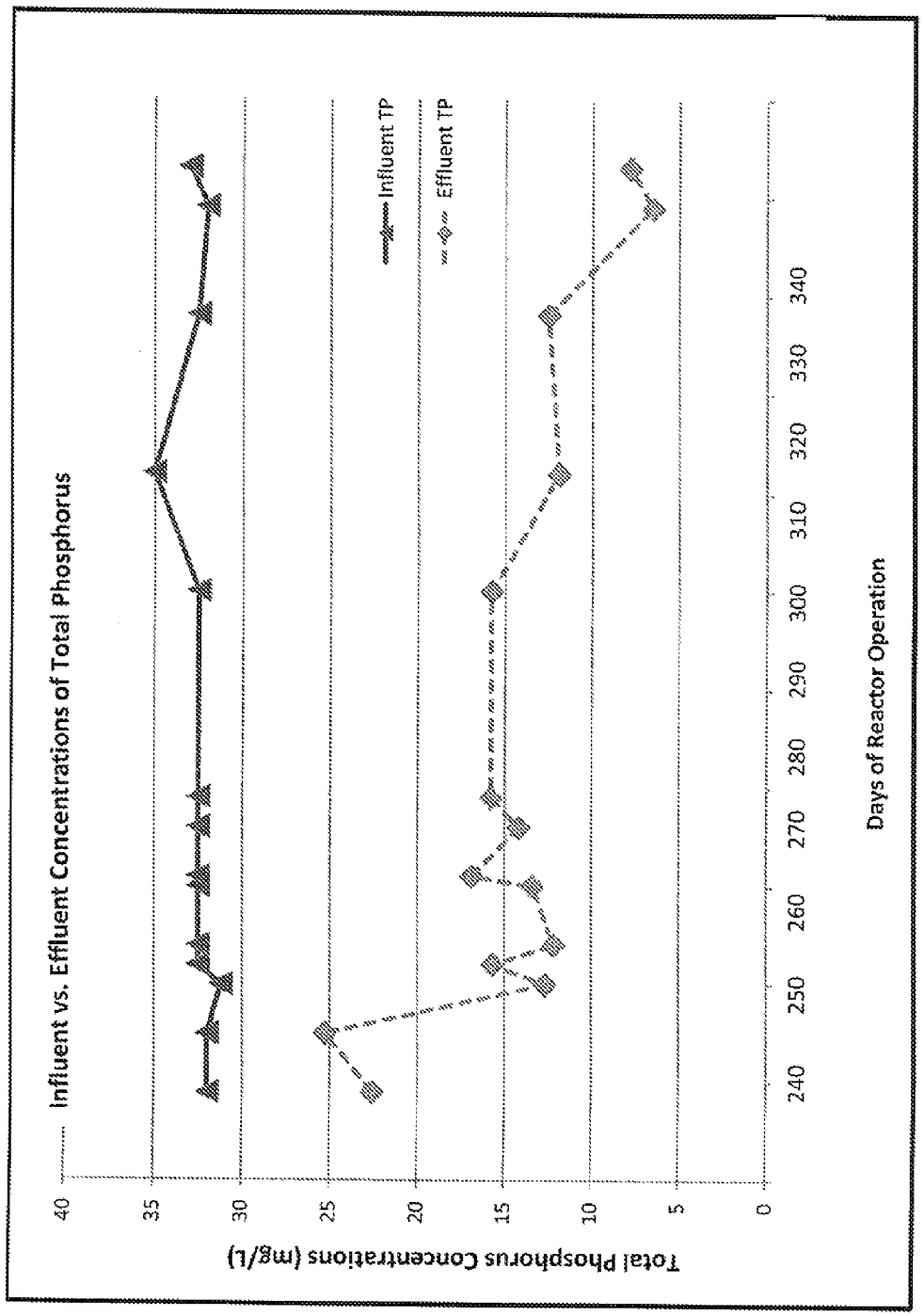
FIG. 2: TP Concentration Profile in the Influent & Effluent Streams

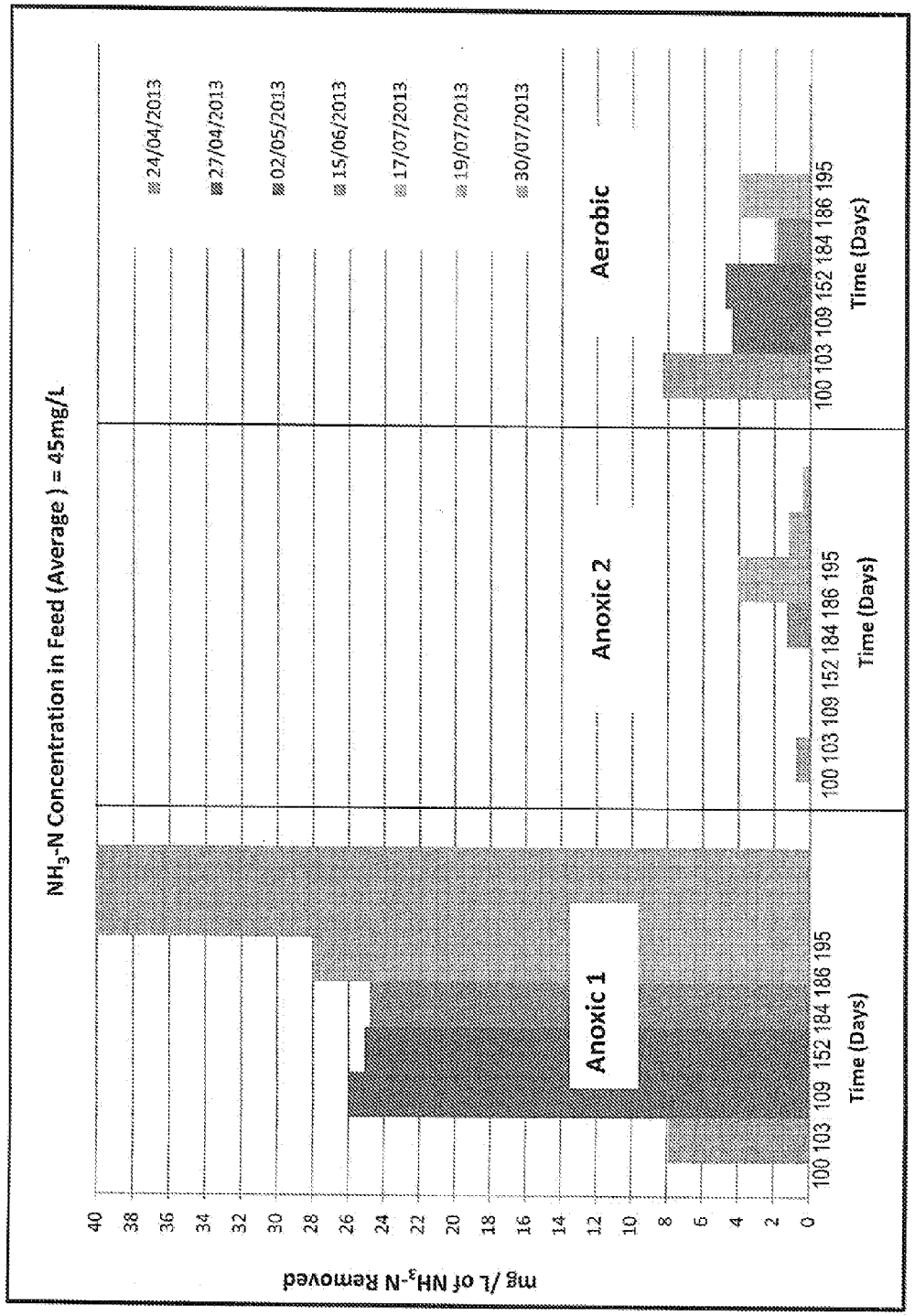
FIG. 3: NH$_3$-N Removal Trends in Anoxic 1, Anoxic 2 and Aerobic Stages

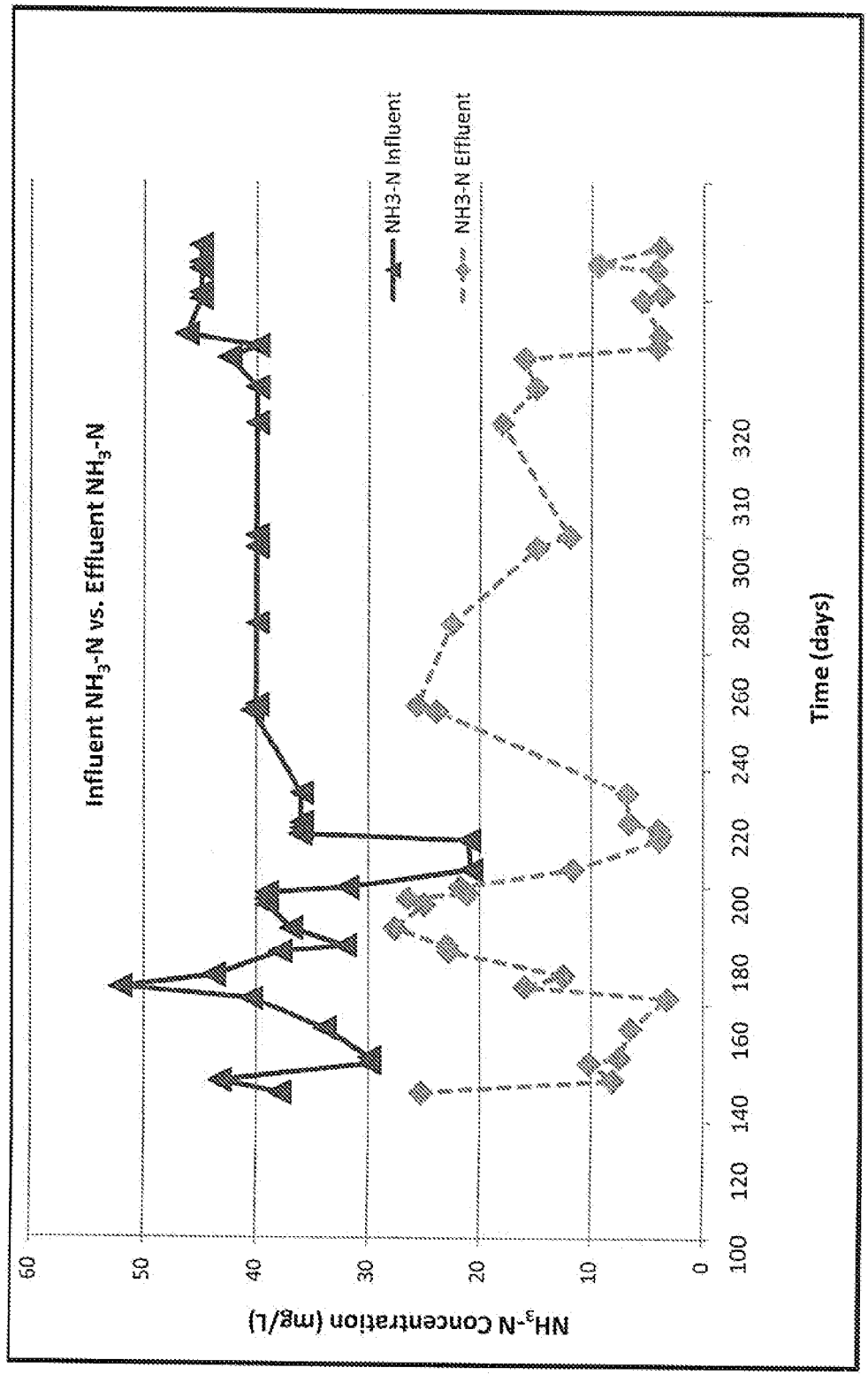
FIG. 4: Influent and Effluent Concentrations of $NH_3$-N

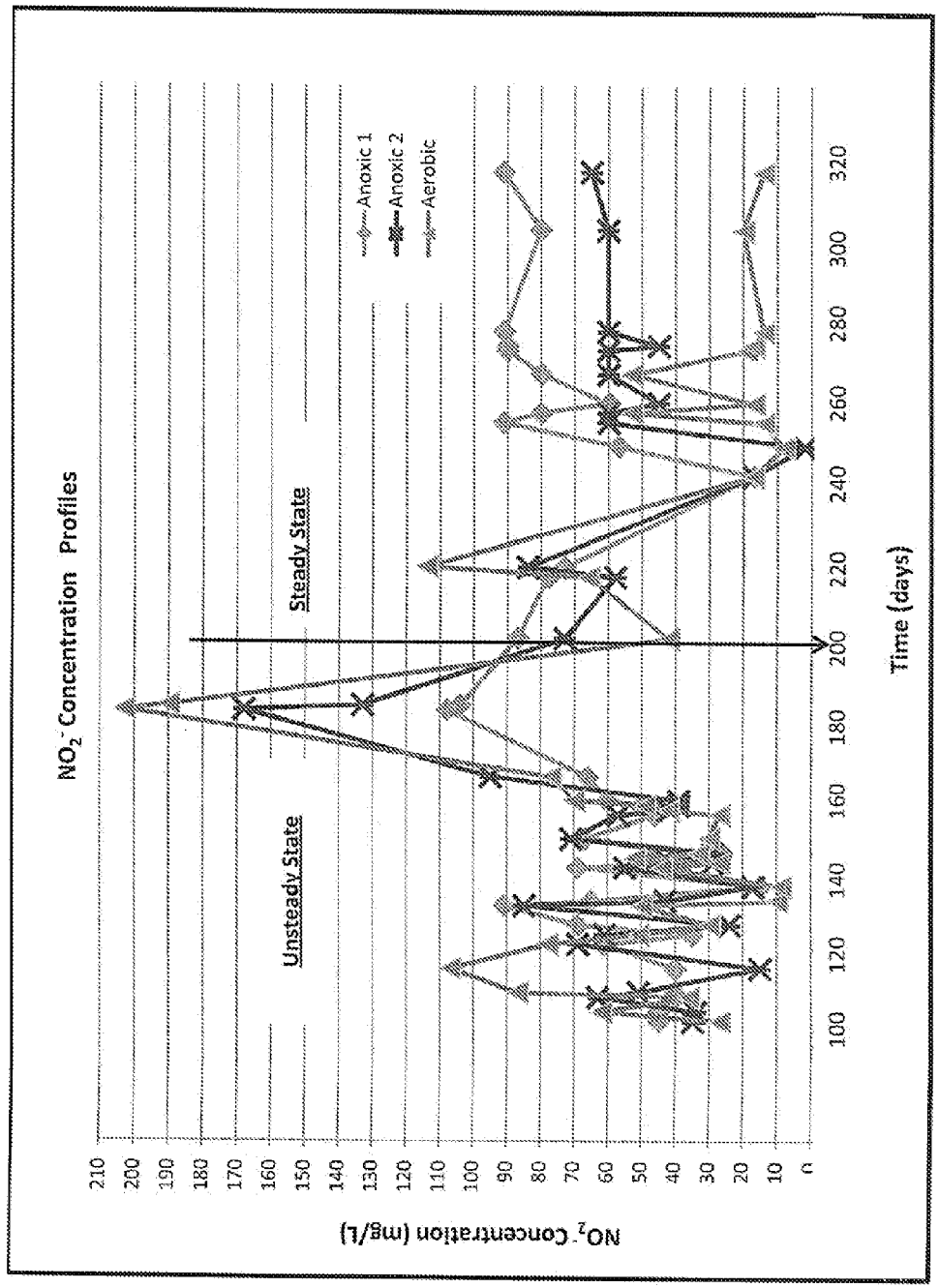
FIG. 5: Effluent Nitrite Concentrations in the Three Stages

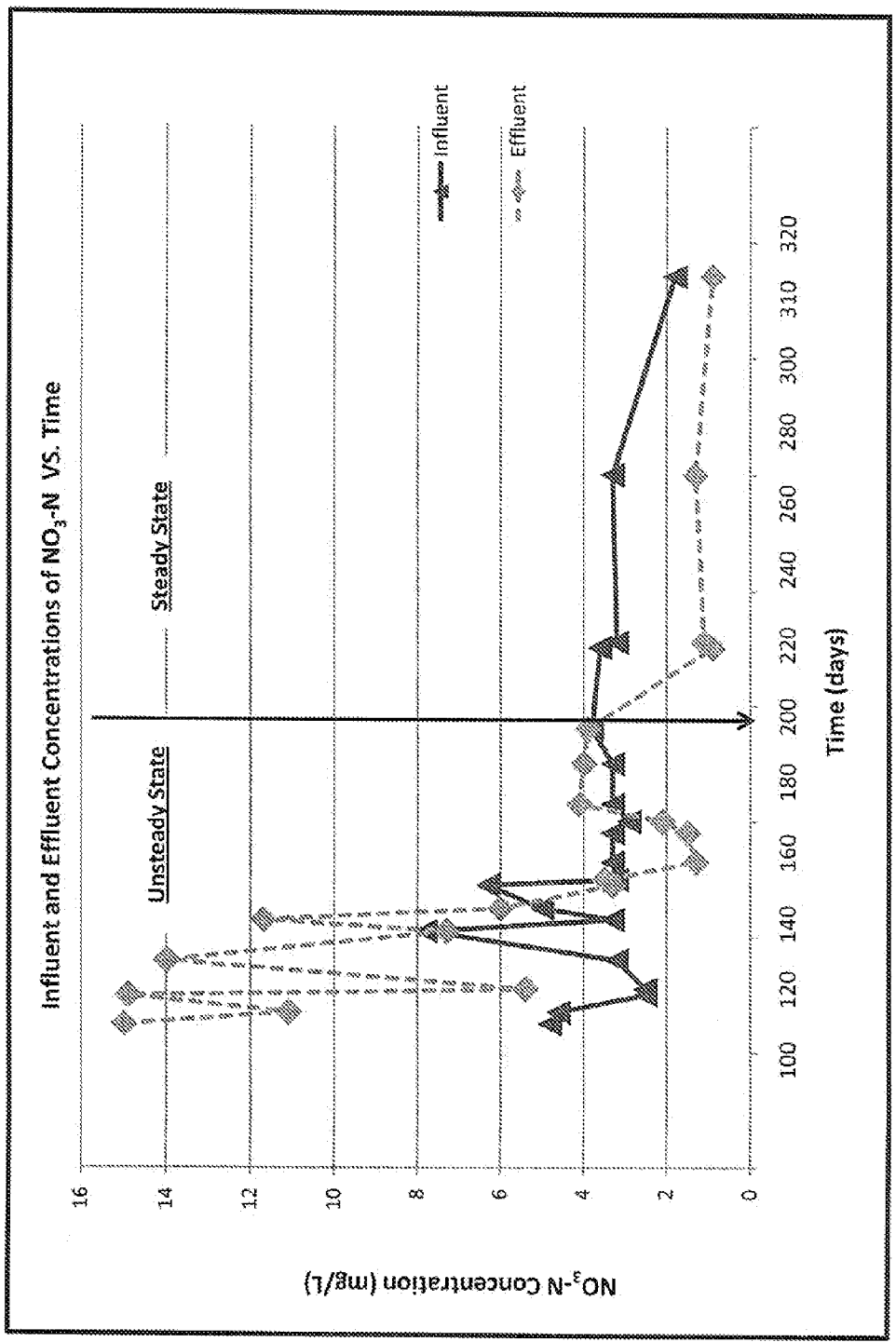
FIG. 6: Influent and Effluent Concentrations of NO$_3$-N (Nitrate)

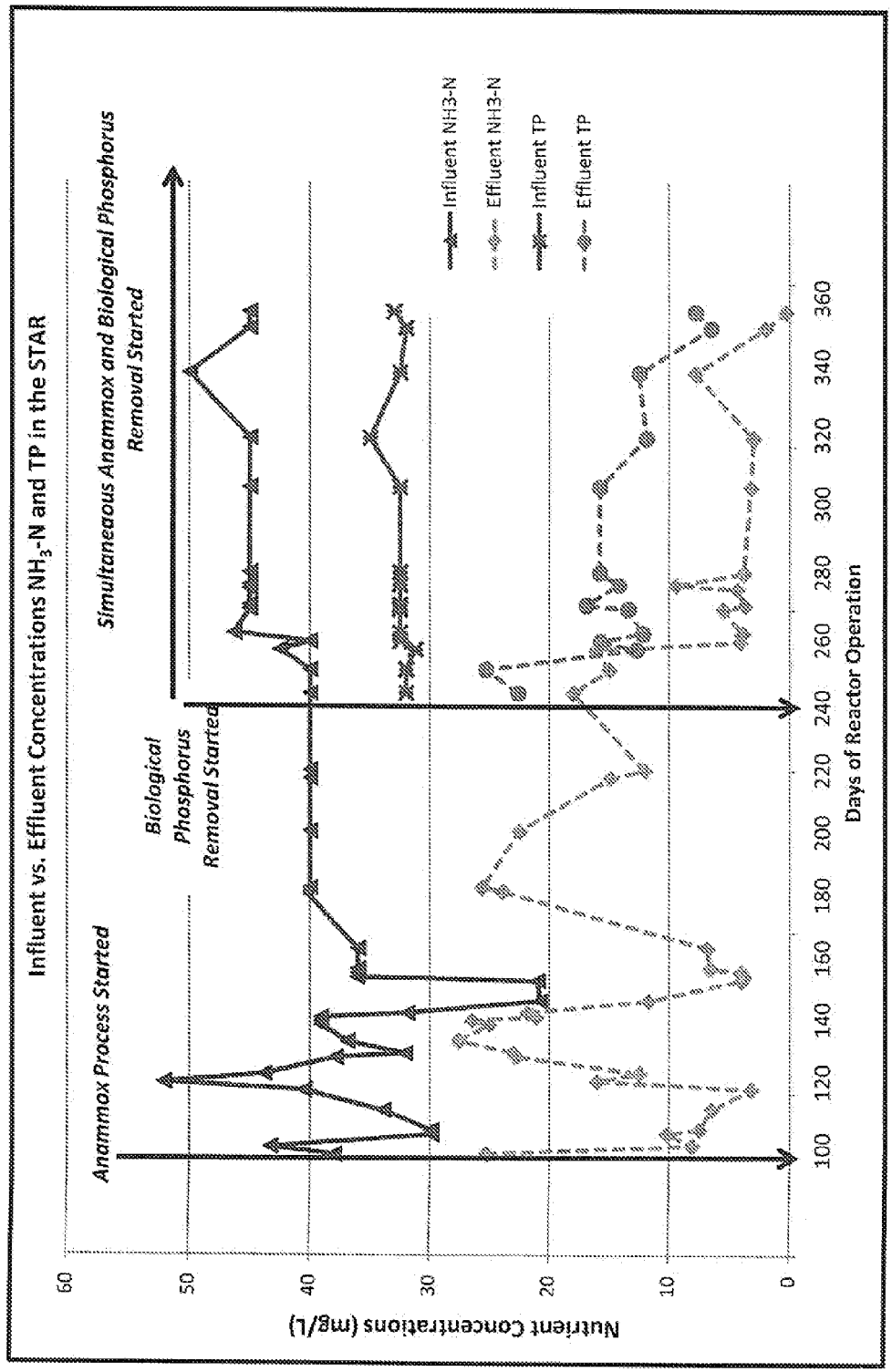
FIG. 7: Anammox and Biological Phosphorus Removal Process Trends and Reactor Operation

SIMULTANEOUS TREATMENT OF AMMONIA AND PHOSPHORUS IN A VERTICAL REACTOR

CROSS REFERENCE TO RELATED APPLICATIONS

This application is a Non Provisional Application which claims the benefit of U.S. Provisional Patent Application No. 61/826,676, filed May 23, 2013, all of which is herein incorporated by reference.

FIELD

The present application relates to a number of biological nutrient removal processes including Anammox Process, Biological Phosphorus Removal (BPR), Partial Nitrification, Full Nitrification, Partial Denitrification and Full Denitrification taking place in a Simultaneous Treatment of Anammox/PAOs Reactor (STAR) coupled with an Anaerobic Lateral Unit (ALU).

BACKGROUND

The removal of nutrients (nitrogen and phosphorous) from industrial and domestic water/wastewater is an environmental objective of importance. The water industry has a high demand for efficient, reliable, cost-effective and compact technologies to remove lame concentrations of nutrients in water/wastewater. Although, there are various nutrient removal technologies, their use is limited because of their high construction area, capital costs, controls complexity and operational costs of sludge recycle. Furthermore, they must meet strict performance criteria like:

Very low effluent concentrations
Low power consumption
Minimum chemical addition
Low environmental impact
Small construction space
Low sludge production The leading nutrient removal processes, are biological. The conventional biological method for ammonia removal is based on two steps:
1. Microbial oxidation of ammonia to nitrate (Nitrification), and
2. Microbial reduction of nitrate to free nitrogen (Denitrification).

Nitrification is the biological oxidation of ammonium ($NH_4^+$) to nitrate ($NO_3^-$) through a two-step process which involves:

Step 1: Ammonia Oxidizing Bacteria (AOBs) convert $NH_4^+$ to $NO_2^+$, and

Step 2: Nitrite Oxidizing Bacteria (NOBs) oxidize $NO_2^-$ to $NO_3^-$ AOBs (i.e. *Nitrosomonas europaea*) are responsible for the first process in nitrification. The reaction is shown below:

$$NH_4^+ + 3/2 O_2 \rightarrow NO_2^- + 2H^+ + H_2O$$

NOBs (i.e. *Nitrobacter*) complete the second step in nitrification:

$$NO_2^- + 1/2 O_2 \rightarrow NO_2^-$$

$NO_3^-$ formed through nitrification is used by plants as a nitrogen source for cellular synthesis or is reduced to $N_2$ through the process of denitrification by heterotrophic bacteria. $NO_3^-$ can, however, contaminate groundwater if it is not used for synthesis or reduced through denitrification. Heterotrophic bacteria in the absence of free oxygen in water utilize the oxygen attached in $NO_3^-$ molecule. The reaction by denitrifying bacteria is:

$$NO_3^- + \text{Organic Matter} \rightarrow N_2 + CO_2 + OH^- + H_2O$$

In 1999 a remarkable microbial process was identified in Delft University of Technology (The Netherlands). This biological process known by the abbreviation of Anammox (Anaerobic Ammonium Oxidation) occurs in many natural ecosystems where $NO_2^-$ and $NH_4^+$ react into free nitrogen ($N_2$). The bacteria mediating this process belong to the bacterial phylum of Planctomycetes. it is estimated that over 50% of the $N_2$ produced in the oceans is caused by Anammox bacteria. The application of this process is a radical departure from conventional biological nitrification/denitrification and owes its extraordinary interest to the unique features of Anammox bacteria including the oxidation of $NH_4^+$ in the absence of oxygen. This characteristic makes Anammox especially attractive both environmentally and economically.

The widely reported slow microbial growth of Anammox and the highly complex intracellular processes are important operating obstacles for the design of processes based on Anammox kinetics. The Anammox processes has an innumerable number of applications in water and wastewater treatment, the food industry, the chemical and petrochemical industries. the mining industry, and in the industrial activities associated with the generation of excess nutrients.

The Anammox process requires partial nitrification so that sufficient concentration of $NO_2^-$ is available for the Anammox bacteria. Therefore, the overall process consists of two steps. The first step is partial nitrification where $NH_4^+$ is partially nitrified to $NO_2^-$ by AOBs.

$$4NH_4^+ + 3O_2 \rightarrow 2NH_4^+ + 2NO_2^- + 4H^+ + 2H_2O$$

The second step is the Anammox process in which $NH_4^+$ and $NO_2^-$ are converted to $N_2$ by Anammox bacteria.

$$NH_4^+ + NO_2^- \rightarrow N_2 + 2 H_2O$$

Partial nitrification and the Anammox process can take place in one reactor where two guilds of bacteria form compact granules. The following equation illustrates a combined partial nitrification and Anammox process.

$$NH_4^+ + 1.32NO_2^- + 0.066HCO_3^- + 0.13H^+ \rightarrow 0.26NO_3^- + 1.02N_2 + 0.066CH_2O_{0.5}N_{0.15} + 2.03H_2O$$

The kinetics and interaction of Anammox with other microbial species like Phosphorous Accumulating Organisms (PAOs) is largely unknown which makes very unreliable the design of BNR processes and reactors. The Anammox process and biological phosphorus removal process have been hitherto developed in separate bioreactors.

The biological phosphorus removal entails the application of PAOs. PAOs were identified by Fuhs and Chen in 1975. The subsequent application of PAOs by J. Barnard in South Africa to remove lame amounts of phosphorus (EBPR-Enhanced biological phosphorous removal) from wastewater, expanded with the Bardenpho process the field of biological nutrient removal. Because chemical salts were not necessary, operating costs were substantially reduced, as were the handling costs of excessive sludge production. One of the drawbacks of EBPR processes is the large number of reactors used, and the construction area required. Furthermore inadequate mixing makes EBPR processes difficult to monitor and control (Alvarez Cuenca and Reza. US Patent Publication No. US-2012-0031836-A1).

SUMMARY

The application presented here describes: 1) a novel process for the simultaneous biological removal of both ammonia and phosphates, and 2) a novel bioreactor named STAR (Simultaneous Treatment by Anammox-PAOs Reactor) where the process takes place. STAR is coupled with an Anaerobic Lateral Unit (ALU) to perform biological phosphorus removal nitrogen removal processes can take place in STAR alone.

The biological process herein developed is based on 1) The microbial kinetics of Anammox, 2) The microbial kinetics of PAOs and Denitrifying PAOs (DPAOs) and 3) Synergetic interactions of these microbial communities in STAR.

STAR provides simultaneous application of advanced microbial treatment for nitrogen (by Anammox) and phosphorous removal (by PAO). This reactor is provided with an exceptionally low construction area, and a configuration with superior operating and retrofitting flexibility.

The process involves specific bacteria whose interactions result in the biological removal of nutrients from wastewater. There are at least six bacterial populations dominating the biomass in STAR coupled with the ALU. These microbial populations are: 1) Anammox, 2) AOBs, 3) PAOs, 4) DPAOs, 5) Non-PAOs Denitritifiers and 6) NOBs. These microbial groups dominate the biomass when there are high concentrations of ammonia, nitrite, nitrate, phosphorus and volatile fatty acids (formic acid, acetic acid, propionic acid, etc.).

The above microbial populations are responsible for the following biological processes respectively: 1) Anammox process, 2) partial nitrification, 3) biological phosphorus removal, 4) combined denitrification and biological phosphorus removal, 5) full denitrification and partial denitrification and 6) full nitrification.

The biological phosphorus removal process takes place simultaneously with other processes including Anammox, partial nitrification, full nitrification, full denitrification and partial denitrification. These processes remove nitrogen compounds such as ammonia, nitrite, nitrate and intermediate nitrogen compounds such as hydroxylamine and hydrazine. The interactions of the above concurrent processes results in high level of nitrogen and phosphorus removal efficiency with minimum carbon and oxygen requirement. In many exiting bioreactors and wastewater treatment plants, the above processes take place separately. In the present case STAR is the first bioreactor that provides simultaneous biological phosphorus removal, Anammox and partial nitrification. In the commercial Anammox plants, phosphorus removal is done using chemicals such as aluminum oxide or ferric chloride. The successful development of species such as PAOs, DPAOs, Anammox, nitrifying and denitrifying bacteria all in one bioreactor is understood to be previously unknown.

All the above processes take place in STAR which consists of three consecutive stages: two Anoxic stages and one Aerobic stage. The three stages are in sequence therefore, wastewater enters the first Anoxic stage which it exits to flow into the second Anoxic stage which it leaves to finally flow into the Aerobic stage.

The bioreactor is coupled with an Anaerobic Lateral Unit (ALU). ALU provides a suitable environment to support a successful biological phosphorus removal process in STAR since it provides the anaerobic conditions demanded by PAOs and DPAOs to remove phosphorus. Thus, ALU provides anaerobic condition for both PAOs and DPAOs uptake acetate and form intracellular polyhydroxyalkanoates (PHAs). The PHAs are stored and utilized by DPAOs and PAOs in the STAR where nitrates and/or dissolved oxygen are present. DPAOs have a double function:

(1) the uptake of phosphorus from the wastewater by breaking down the nitrate molecules into oxygen and nitrogen gas, consuming the oxygen and releasing nitrogen gas; and (2) DPAOs uptake phosphorus, form poly-phosphate (poly-P) and store it (poly-P) intracellularly.

Similarly, the above mechanism by DPAOs takes place in the first and second Anoxic stage.

The first Anoxic stage receives three streams: the feed stream, the recycled biomass from the ALU and wastewater recycle from the Aerobic stage. The presence of the three streams provides anoxic condition in the first and second Anoxic stages. This Anoxic condition is required for the Anammox process, partial nitrification-and biological phosphorus removal.

The second Anoxic stage receives one stream from the first Anoxic stage.

The last stage of the bioreactor (STAR) is the Aerobic stage located after the second Anoxic stage, In this stage, normal PAOs are present where they use dissolved oxygen (DO) to uptake phosphorus, form and store intracellular poly-phosphate. In addition to the biological phosphorus removal, the Aerobic stage carries out Anammox, partial and full nitrification.

BRIEF DESCRIPTION OF THE FIGURES

An understanding of the description herein may be assisted with reference to the figures in which:

FIG. 1 is a schematic drawing of the bioreactor, the Anaerobic Lateral Unit (ALU) and the streams and the methods in accordance with an embodiment;

FIG. 2 is a graph, showing influent and effluent TP Concentration Profiles;

FIG. 3 is a graph showing influent and effluent Ammonia Concentration Profiles;

FIG. 4 is a graph showing influent and effluent Nitrate Concentration Profiles; and FIG. 5 is a graph showing influent and effluent Nitrite Concentration.

FIG. 6 is a graph showing influent and effluent Concentrations of NO3—N (nitrate); and FIG. 7 is a graph showing Anammox and biological phosphorus removal process trends and reactor operation.

DETAILED DESCRIPTION

FIG. 1 is a schematic drawing of the bioreactor, the Anaerobic Lateral Unit (ALU) and the streams and methods in accordance with an embodiment, Feed Tank is labeled # 1 on FIG. 1. It contains wastewater with high ammonia and phosphorus concentrations which comes from a pre-treatment where total suspended solids (TSS) and FOG are removed.

Anoxic 1 is the first stage of the bioreactor (# 2 on FIG. 1) which provides anoxic condition so that phosphorus, nitrate and ammonia can be removed.

Anoxic 2 is the second stage of the bioreactor (# 3 on FIG. 1) which provides anoxic conditions (similar to the first stage) so that phosphorus, nitrate and ammonia can be removed via denitrifying PAOs, Anammox, Ammonium Oxidizing Bacteria (AOBs).

Aerobic Stage is the third and the last stage of the bioreactor (# 4 on FIG. 1) which is aerated using fine bubble air diffusers (Letter J on FIG. 1). The following biological processes take place in this stage: biological phosphorus uptake via DPAOs and PAOs, Anammox process via Anammox bacteria, nitrification and partial nitrification.

Secondary Clarifier and/or a Membrane Filtration Unit (# 5 on FIG. 1) filter the effluent from the STAR. The retentate from this unit is transferred to the Anaerobic Lateral Unit (ALU). The permeate usually goes to the next treatment level in a wastewater treatment plant.

Anaerobic Lateral Unit (ALU) is an important component of the biological phosphorus removal (# 6 on FIG. 1). The phosphorus release and acetate uptake take place in ALU. STAR with 2 Anoxic and 1 Aerobic stage provides the proper condition for DPAOs and PAOs to uptake phosphorus from the wastewater (phosphorus released in ALU plus phosphorus in the feed).

VFA Container: volatile fatty acids (VFA) are needed for the biological phosphorus removal which take place in both ALU and STAR (# 7 on FIG. 1).

All the streams with their expected concentrations are labelled using letters A to I. Feed stream (letter A on FIG. 1) enters the bioreactor from the top and consist of the following nutrient concentrations:

Ammonia ($NH_3$)=50 mg/L
Nitrite ($NO_2^-$)=50-70 mg/L
Nitrate ($NO_3^-$)=20-30 mg/L
Total Phosphorus (TP)=25-30 mg/L Effluent stream from the Anoxic stage 1 (letter B on FIG. 1) contains the concentrations of the nutrient shown below:

Ammonia ($NH_3$)=30-35 mg/L
Nitrite ($NO_2^-$)=80-100 mg/L
Nitrate ($NO_3^-$)=10-20 mg/L
Total Phosphorus (TP)=18-22 mg/L Effluent stream from the Anoxic 2 stage (letter C on FIG. 1) contains the concentrations of the nutrient shown below:

Ammonia ($NH_3$)=20-30 mg/L
Nitrite ($NO_2^-$)=80-100 mg/L
Nitrate ($NO_3^-$)=10-20 mg/L
Total Phosphorus (TP)=13-16 mg/L Effluent stream from the Aerobic stage (letter D on FIG. 1) contains the concentrations of the nutrient shown below:

Ammonia ($NH_3$)=<5 mg/L
Nitrate ($NO_3^-$)=<1 mg/L
Total Phosphorus (TP)=<1 mg/L
Dissolved Oxygen (DO)=2.5-3.5 mg/L Recycle stream (letter E on FIG. 1) from the Aerobic stage to the Anoxic 1 stage results in reduction of $NO_3^-$ in the final effluent. It also helps to enhance the biological phosphorus removal in the first and second Anoxic stage through DPAOs.

Stream labelled as letter F on FIG. 1 contains high concentration of sludge which is recycled back into the ALU. It helps to maintain all the bacteria involved in the biological processes. It is also an important component of the biological phosphorus removal process. Since PAOs and DPAOs can be reused in a number of cycles before they decay.

The stream from the VFA container (letter G on FIG. 1) contains organic carbon such as acetic acid and propionic acid which can be utilized by all bacteria in the ALU. In addition, DPAOs and PAOs under anaerobic condition provided by the ALU, uptake and store the fermented VFA and form polyhydroxyalkanoates (PHAs) intracellularly which are used in the STAR bioreactor as a source of energy for phosphorus uptake by PAOs and DPAOs. Anammox, nitrifiers and denitrifiers also consume VFA as their source of energy.

The stream leaving ALU (letter H on FIG. 1) contains high concentrations of PAOs and DPAOs with high amounts of stored PHAs. There will be phosphorus removal in the two Anoxic stages via DPAO and under the Aerobic stage phosphorus uptake is completed using normal PAOs as well as DPAOs.

The Anammox process, partial nitrification, full nitrification, partial denitrification and full denitrification take place alongside biological phosphorus removal in the Anoxic 1, Anoxic 2 and Aerobic stages of STAR.

In one experiment, STAR was seeded with returned activated sludge obtained from the North Toronto Water Pollution Control plant (Toronto, ON, Canada). The bioreactor was continuously fed with a balanced composition of nutrients and minerals. Table 1 shows the constituents of the synthetic feed.

TABLE 1

| Chemicals | Concentration (volume/grams) |
| --- | --- |
| VFA: Propionic Acid $C_3H_6O_2$ | 10 ml |
| VFA: Acetic Acid | 10 ml |
| $NH_4Cl$ | 11.25 g~60 mg/L of $NH_4$ |
| $KH_2PO_4$ | 2.77 g~10.526 mg/L of TP |
| $Na_2HPO_4$ | 3.125 g~10.99 mg/L of TP |
| $Na_2HPO_4H_2O$ | 2.807 g~9.87 mg/L of TP |
| Urea $CH_4N_2O$ | 5 g |
| Minerals | |
| $MgSO_4 \cdot 7H_2O$ | 1.5 g |
| $CaCl_2 \cdot H_2O$ | 1.5 g |
| $Na_2SO_4$ | 1.5 g |
| $FeCl_3$ | 1.5 g/L |
| $ZnCl_2$ | 0.12 g/L |
| EDTA | 7 mg/l |

It is intrinsically challenging to cultivate and develop an integrated Anammox, partial nitrification, full nitrification, full denitrification, partial denitrification and biological phosphorus removal (BPR) in a bioreactor under the same environmental conditions. In wastewater treatment, BPR is usually separated from other nutrients and contaminants removal processes due to the hypersensitivity of the PAOs and DPAOs involved in this process. PAOs and DPAOs are slow growing bacteria and their growth, reproduction and performance are susceptible to deterioration. The growth of Glycogen Accumulating Organism (GAOs) in a BPR is the main cause for BPR failure. To protect the BPR against GAOs, the environmental parameters are being carefully selected. Analytical tests were performed using a spectrophotometer and test kits for phosphorus measurement. The nutrient concentration measurements from four sampling points (Feed, Anoxic1/Anoxic2 stages, Aerobic stage) were continuously collected and analyzed for over 340 days. It took almost 230 days (ca. 7 months) from the reactor start up date (Nov. 10, 2012) to detect the BPR process. The phosphorus removal efficiency increased from 21%, observed on Jul. 4, 2013, to approximately 80% on Oct. 5, 2013. High nitrite concentration in the bioreactor, during the first seven months of operation, confirmed the inhibitory effect of nitrite on PAOs and DPAOs activities. The experimental data shown in FIG. 2 confirmed the biological phosphorus removal results in STAR.

It was observed that concentration measurements for $NH_3$—N, $NO_2^-$ and $NO_3^-$N started in the first week of February 2013 that is 50 days after the start up date (Nov. 10, 2012). As it was expected from the slow growth rate of Anammox bacteria, the nitrogen removal results during the month of February were unsteady but explicable. FIG. 3 shows concentration profiles for $NH_3$ in the influent, effluent and two Anoxic stages for over 100 days. As it can be observed from FIG. 3, $NH_3$—N was mainly removed in the Anoxic stage where $NO_2^-$ and $NO_3^-$—N concentrations were high. In Anoxic stage 1, where maximum $NH_3$—N removal took place, the DO concentration was approximately 0.1 mg/l. FIG. 4 shows the concentrations of $NH_3$—N in both the influent and effluent streams from March till October 2013. The $NH_3$—N concentration in the influent and effluent of the reactor were irregular at the beginning of the reator operation. There were fluctuations in both streams in the first 200 days from the start up date. Also, the $NH_3$—N concentration in the influent was kept between 40 and 45 mg/L, after 200 days of continuous operation. Over time, $NH_3$—N trends in the effluent decreased to below 5 mg/L while influent concentrations were almost constant. These results show that STAR can successfully develop and sustain the $NH_3$—N removal process through Deammonification.

The combined $NO_2^-$ concentration in the feed and the two Anoxic stages was found to be much higher than the desired concentration of 80 mg/L. This means that $NO_2^-$ involved in the Anammox process may come from different sources such as:

1) Partial nitrification
2) Partial Denitrification (generation of $NO_2^-$ from $NO_3^-$) and
3) High $NO_2^-$ concentration in the recycle stream The accumulation of $NO_2^-$ is an unfavourable occurrence which can slow down, or even completely stop the Anammox activities and alter the population of PAOs and DPAOs. FIG. 5 illustrates a period of high nitrite fluctuations in three stages of the STAR. The concentration of nitrite in the Aerobic stage was as high as 200 mg/L after 190 days of reactor operation. And after 200 days, the nitrite concentration showed a decreasing trend in the Aerobic stage and minimal variations in the Anoxic 1 and 2 were observed (shown in blue and red in FIG. 5). These results correspond well with high $NH_3$—N removal in the $1^{st}$ Anoxic stage shown in FIG. 3. After day 200, Anoxic 1 contained higher nitrite concentration which can be related to high rate of Deammonification in this stage compared to Anoxic 2 and Aerobic stages.

FIG. 6 shows the concentration of $NO_3$—N in the influent and effluent of the bioreactor. This indicates that the $NH_3$—N concentration has not decreased through a complete nitrification since the $NO_3$—N concentration in the effluent was very low. These results indicate that $NH_3$—N was not converted to $NO_3$—N via complete nitrification. That is $NH_3$—N was oxidized and converted to $N_2$ by $NO_2^-$ via the Anammox process. The Anammox process has reached the steady condition after day 200. The steady state condition can be seen on FIG. 6 which shows a sharp reduction in $NO_3$—N concentration in the effluent.

FIG. 7 combines both FIG. 2 and FIG. 4 shown previously. It exhibits the start up date of Anammox and biological phosphorus removal processes.

Polymerization Chain Reaction (PCR) techniques were used to identify the microbial population. The presence of Anammox and PAOs were successfully confirmed through PCR analytical methods.

What is claimed is:

1. A method of removing nutrient from water/wastewater in a bioreactor having three consecutive stages comprising two Anoxic stages and one Aerobic stage configured vertically such that a flow of the water/wastewater between the stages occurs via gravity, the bioreactor, coupled with an Anaerobic Lateral Unit (ALU) anaerobic unit located laterally, of the bioreactor, the method comprising conducting a biological removal of nutrients from said water/wastewater using a plurality of biological processes simultaneously in said bioreactor and said ALU; and wherein the biological processes include at least phosphorous removal process, a nitrification process and a denitrification process.

2. The method of claim 1 wherein due to the interactions of the microbial population, the biological processes further include a partial nitrification process a full nitrification process, a partial denitrification process and a full denitrification process.

3. The method of claim 1 wherein the three consecutive stages of the bioreactor comprise two Anoxic stages configured consecutively followed by one Aerobic stage.

4. The method of claim 3 comprising conducting the biological processes simultaneously including, a partial nitrification process, a full nitrification process, a partial denitrification process, a full denitrification process and a biological phosphorus removal process in all three consecutive stages of the bioreactor.

5. The method of claim 4 wherein ammonia is removed via the partial nitrification process and the full nitrification process in all three consecutive stages of the bioreactor while excluding the ALU.

6. The method of claim 4 wherein the nitrite and nitrate produced via, the partial nitrification process and the full nitrification process are removed through the partial denitrification process (via denitrifiers), the full denitrification process (via denitrifiers) and the biological phosphorus removal process (via Denitrifying Phosphorous Accumulating Organisms DPAOs) to produce free nitrogen; wherein the partial denitrification process and the full denitrification process are conducted in all three consecutive stages of the bioreactor along with, partial nitrification, full nitrification and biological phosphorous removal process while excluding the ALU.

7. The method of claim 6 wherein denitrification through the biological phosphorus removal via DPAOs requires all three consecutive stages of the bioreactor coupled with the ALU.

8. The method of claim 1 wherein nitrite produced through the partial nitrification process and the partial denitrification process is removed via the full nitrification process, the full denitrification process and denitrification through the phosphorus removal process via DPAOs.

9. The method of claim 1 wherein the ALU comprises a biomass store to support volatile fatty Phosphorous Accumulating (PAOs) and DPAOs and wherein the method comprises feeding at least some of the PAOs and DPAOs to the bioreactor to support the phosphorus removal process.

10. The method of claim 9 wherein the PAOs and DPAOs form intracellular polyhydroxyalkanoates (PHAs) using the volatile fatty acids in the ALU.

11. The method of claim 9 wherein a third stage of the three consecutive stages of the bioreactor is coupled to the ALU and the method comprises feeding the ALU with a retentate from the bioreactor.

12. A wastewater treatment system comprising:
a bioreactor having three consecutive stages configured vertically such that a flow the wastewater from one stage to the next operates via gravity; and
an anaerobic lateral unit (ALU) comprising an anaerobic unit coupled to and located laterally to the bioreactor;
wherein the bioreactor and ALU are configured to conduct a biological removal of nutrients from the wastewater using a plurality of biological processes simultaneously; and,
wherein the biological processes include at least a phosphorous removal process, a nitrification process and a denitrification process.

13. The system of claim 12 wherein the biological processes further include a partial nitrification process, a full nitrification process, a partial denitrification process and a full denitrification process.

14. The system of claim 12 wherein the three consecutive stages of the bioreactor comprise two Anoxic stages configured consecutively followed by one Aerobic stage.

15. The system of claim 12 wherein the bioreactor is coupled to the ALU to feed the ALU with a retentate from the bioreactor.

16. The system of claim 12 wherein the ALU is coupled to feed the bioreactor at a first of the three consecutive stages.

17. The system of claim 12 wherein a recycle stream is coupled from a third of the three consecutive stages in the bioreactor to a first of the three consecutive stages to enhance at least one of nitrate reduction and phosphorus reduction.

18. The system of claim 12 further comprising a source of volatile fatty acids for feeding PAOs and DPAOs in the ALU.

19. The system of claim 18 wherein the ALU stores the volatile fatty acids, PAOs and DPAOs and feeds at least some of the PAOs and DPAOs to the bioreactor to support the phosphorous removal process.

* * * * *